United States Patent [19]

Lange et al.

[11] Patent Number: 5,218,205
[45] Date of Patent: Jun. 8, 1993

[54] READ-OUT SYSTEM FOR A LUMINESCENT STORAGE SCREEN

[75] Inventors: Gottfried Lange; Hans-Erich Reinfelder, both of Erlangen, Fed. Rep. of Germany

[73] Assignee: Siemens Aktiengesellschaft, Munich, Fed. Rep. of Germany

[21] Appl. No.: 879,242

[22] Filed: May 6, 1992

[30] Foreign Application Priority Data

May 14, 1991 [DE] Fed. Rep. of Germany ....... 4115725

[51] Int. Cl.$^5$ .............................................. G03B 42/00
[52] U.S. Cl. .................................. 250/327.2; 358/484
[58] Field of Search ................ 250/327.2 D, 327.2 E, 250/327.2 F; 358/484

[56] References Cited

U.S. PATENT DOCUMENTS

| | | | |
|---|---|---|---|
| 4,554,453 | 11/1985 | Feigt et al. . | |
| 4,564,760 | 1/1986 | Noguchi et al. | 250/327.2 |
| 4,742,225 | 5/1988 | Chan | 250/327.2 |
| 4,743,758 | 5/1988 | Chan et al. | 250/327.2 |
| 4,743,759 | 5/1988 | Boutet . | |
| 4,775,791 | 10/1988 | Owen et al. | 250/327.2 |
| 4,778,994 | 10/1988 | Conrad et al. . | |
| 4,818,880 | 4/1989 | Matsuda et al. . | |
| 4,829,180 | 5/1989 | Goto et al. | 250/327.2 |
| 4,931,642 | 6/1990 | Hosoi et al. | 250/327.2 |
| 5,017,781 | 5/1991 | Lange et al. | 250/327.2 |

FOREIGN PATENT DOCUMENTS

| | | |
|---|---|---|
| 0296365 | 3/1991 | European Pat. Off. . |
| 3205693 | 8/1983 | Fed. Rep. of Germany . |
| 3242399 | 5/1984 | Fed. Rep. of Germany . |
| 3433141 | 3/1986 | Fed. Rep. of Germany . |
| 8903162 | 6/1989 | Fed. Rep. of Germany . |
| 3803766 | 8/1989 | Fed. Rep. of Germany . |
| 8911380 | 3/1990 | Fed. Rep. of Germany . |
| 2-235042 | 9/1990 | Japan ............................... 250/327.2 |

*Primary Examiner*—Constantine Hannaher
*Assistant Examiner*—Edward J. Glick
*Attorney, Agent, or Firm*—Hill, Steadman & Simpson

[57] ABSTRACT

A read-out system for a luminescent storage screen of the type used in an x-ray diagnostics installation has a scan beam generator which generates a scan beam of a first wavelength, a beam deflector for deflecting the scan beam to planarly scan a luminescent storage screen pixel-by-pixel to retrieve the stored image, the scan beam causing the storage screen to luminesce and generate light of a second wavelength which is detected by a detector system. The detector system includes a light conductor which conducts the light onto a light detector. The detector system includes a filter for light of the first wavelength, which is arranged in the immediate proximity of the point of incidence of the scan beam on the luminescent storage screen. The filter is in the form of a slot-shaped opening for the scan beam.

3 Claims, 2 Drawing Sheets

READ-OUT SYSTEM FOR A LUMINESCENT STORAGE SCREEN

BACKGROUND OF THE INVENTION

1. Field of the Invention

The present invention is directed to a read-out system for a luminescent storage screen, of the type suitable for use in an x-ray diagnostics installation for retrieving a latent image stored in the screen.

2. Description of the Prior Art

Read-out systems are generally known for use in x-ray diagnostics installation for retrieving an image which is latently stored in the screen. In such known systems, the luminescent storage screen is planarly scanned pixel-by-pixel with a deflected scan beam of a first wavelength in order to retrieve the image, the scan beam causing the storage screen to luminesce and generate light of a second wavelength. The light is detected by a detector system which includes a light conductor which conducts the light of the second wavelength onto a light detector.

Such a read-out system is disclosed in European Application 0 363 522, wherein a tubular light conductor having mirrored interior walls is disposed over the luminescent storage screen. The tubular light conductor has a slot-shaped passage through which the scan beam, which is generated by a radiation source and is deflected for scanning, can pass so that a complete line of the luminescent storage screen can be scanned and excited. Due to the excitation, the luminescent storage screen emits light pixel-by-pixel, this light being reflected by the walls of the tubular light conductor and being conducted onto light detectors attached to one side wall of the tubular light conductor. These light detectors generate an electrical signal corresponding to the brightness of the light emitted by each pixel of the luminescent storage screen.

In such a light conductor, however, it is a problem that not only the light emitted by the luminescent storage screen (i.e., the useful signal) passes through the entry opening of the light conductor, but also the light of the scan beam, reflected at the surface of the luminescent storage screen, proceeds into the light conductor as an unwanted signal, and can emerge within the light conductor at a different location due to reflections. The intensity of this reflected light of the first wavelength is considerably stronger than that of the emitted light of the second wavelength. The reflected light may also excite pixels lying at a greater distance within the scan line, so that a constant premature read-out of all pixels ensues, as seen in totality. This known system, therefore, includes a filter for eliminating the reflected light which is disposed in front of the detector. Although this filter prevents light of the first wavelength from reaching the light detector, the filter cannot prevent the aforementioned premature read-out.

SUMMARY OF THE INVENTION

It is an object of the present invention to provide a read-out system for an x-ray diagnostics installation of the type described above, which prevents a premature read-out of the luminescent storage screen.

The object is achieved in accordance with the principles of the present invention in a read-out system for a luminescent storage screen having a filter for light of the first wavelength in the scan beam, the filter being arranged in the immediate proximity of the point of incidence of the scan beam on the luminescent storage screen, and being in the form of a slot-shaped opening for the scan beam. This assures that the scan beam can be incident on luminescent storage screen unimpeded. The back-scattered light, however, is suppressed by the filter, so that it cannot proceed to the light conductor. The emitted light, whose wavelength is outside the filter range, can proceed into the entry opening of the light conductor unimpeded. If the reflection angle of the scan beam is so small that some reflected light proceeds through the opening of the filter, this reflected light, now in the light conductor, must again pass through the filter in the opposite direction in order to be again incident on the luminescent storage screen to create any disturbing excitation. Such a second passage through the filter, if it occurs, completely eliminates such reflected light.

Moreover, the slight portion of the light, from the scan beam which may enter into the light conductor is prevented from being incident on the detector by arranging a further filter directly preceding the light detector.

In a tubular light conductor having a slot-shaped passage for the scan beam, and wherein the detector is attached in the opening of the wall of the tubular light conductor, it has prove advantageous to arrange the filter preceding the entry opening of the light conductor for the light emitted by the luminescent storage screen.

DESCRIPTION OF THE PREFERRED EMBODIMENTS

Figure 1:
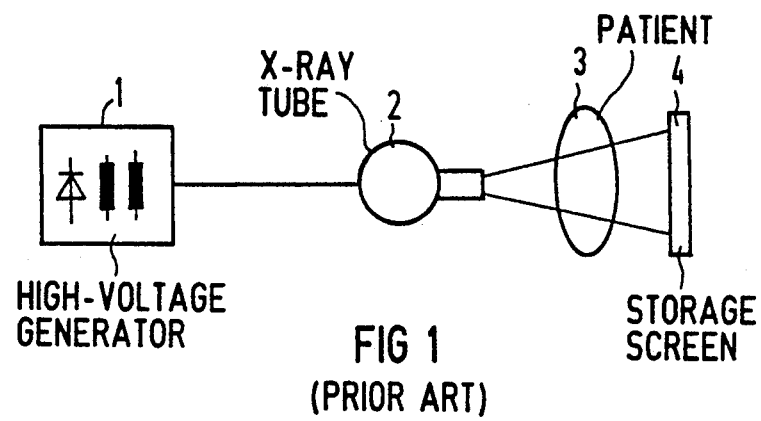
FIG. 1 is a schematic diagram showing the basic components for generating an image in a conventional x-ray diagnostics installation.

As shown in FIG. 1, a conventional x-ray diagnostics installation has an x-ray tube 2 which is fed by a high-voltage generator 1 for emitting an x-ray beam which penetrates a patient 3. The x-rays attenuated by the patient 3 in accordance with the transparency of the patient are incident on a luminescent storage screen 4. This incident radiation produces electronic holes in the luminescent storage screen 4, which are held in potential traps of the phosphor, so that a latent image is stored in the luminescent storage screen 4.

Figure 2:
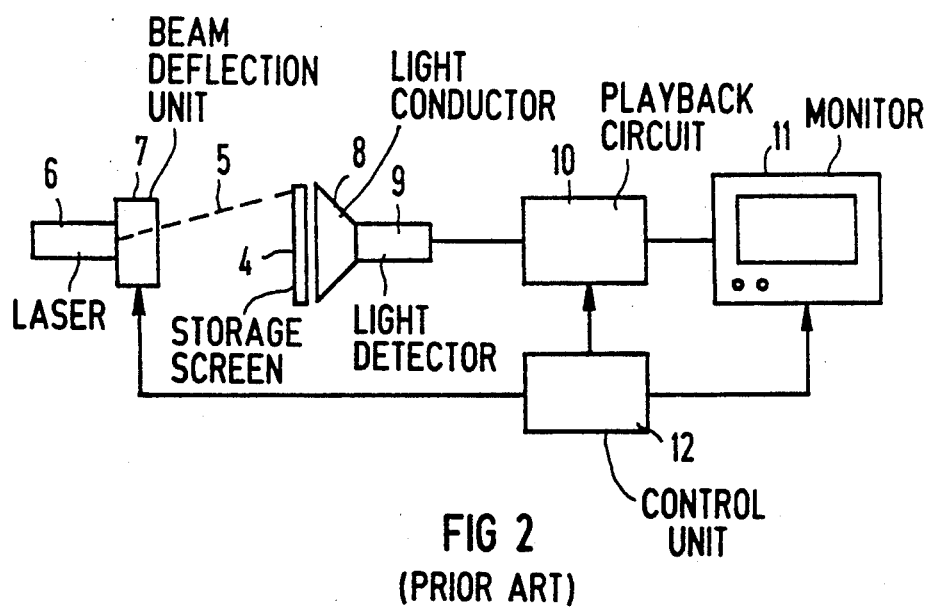
FIG. 2 is a schematic diagram showing the basic components for retrieving and displaying an image in a conventional x-ray diagnostics installation.

For retrieving (playback) of the latent image, the luminescent storage screen 4 is scanned pixel-by-pixel by a scan beam 5 which is generated by a laser 6, and is deflected across the surface of the luminescent storage screen 4 line-by-line by a deflection unit 7, as shown in FIG. 2. The deflection unit 7, for example, may be an electro-optical beam deflector of the type having a deflection mirror for the horizontal deflection. The vertical deflection can be achieved by parallel feed (movement) of the luminescent storage screen 4 in a direction perpendicular to the scan line.

As a result of scanning with the scan beam 5, all pixels lying in the luminescent storage screen 4 are successively excited line-by-line and caused to luminesce. A light conductor 8 acquires the light emitted by the luminescent storage screen 4, and conducts it to a detector 9, which generates an electrical signal corresponding to the brightness of the scanned pixels. This electrical signal is supplied to a playback circuit 10, which generates a video signal for display on a monitor 11 from the individual, analog output signals of the detector 9. The playback circuit 10 can contain image memories, processing circuits and transducers in a known manner. A control unit 12 generates the control clock signals for synchronizing the deflection unit 7, the playback circuit 10 and the monitor 11.

Figure 3:
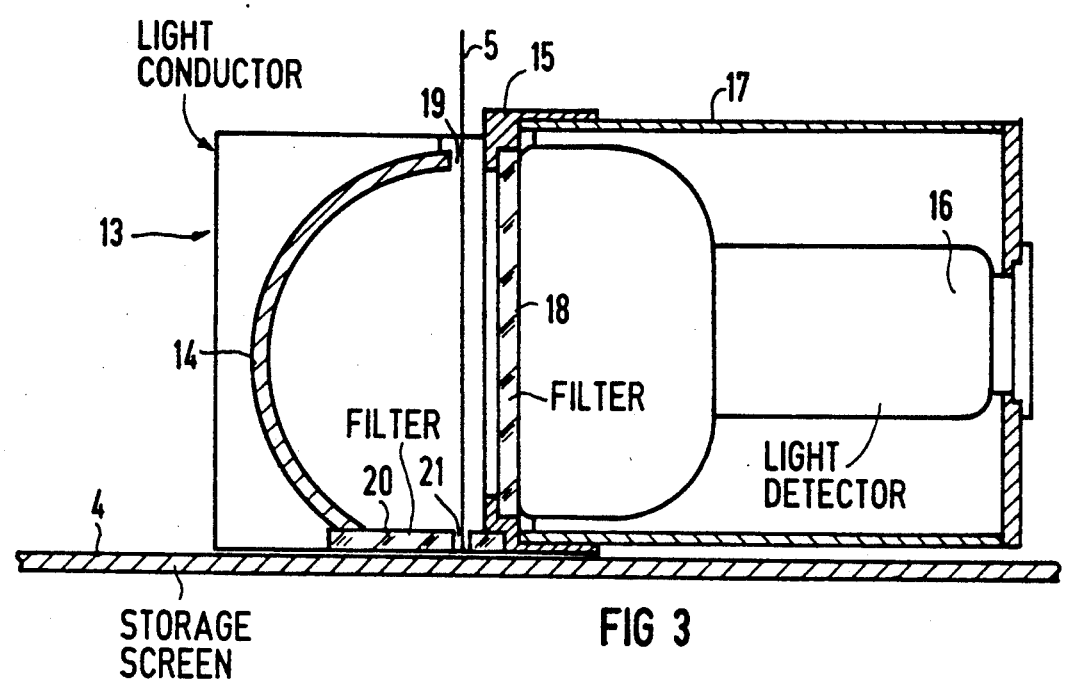
FIG. 3 is a side sectional view of a read-out system for an x-ray diagnostics installation constructed in accordance with the principles of the present invention.

The structure of a detector arrangement in a read-out system constructed in accordance with the principles of the present invention is shown in FIG. 3, which can be employed in the conventional system shown in FIG. 2. The detector system includes a light conductor and a light detector. The light conductor is in the form of a tubular light conductor 13, having a half-shell 14 with a circular diameter. The opening of the half-shell 14 is substantially perpendicular to the luminescent storage screen 4, and proceeds parallel to the alignment of the scan line which the scan beam 5 sweeps on the luminescent storage screen 4. A detector 16 is held in a mount 15 so as to be disposed opposite the opening of the half-shell 14. The detector 16 is surrounded by a shielding 17. A filter 18 is disposed in front of the detector 16, which filters light from the scan beam 5 which may find its way to that location within the read-out system. The light from the scan beam 5 is a first wavelength. The detector 16 may consist of one or more photomultipliers having transmitted light cathodes.

The surfaces of the light conductor 13 are mirrored for good light guidance. This can be done using barium sulfate (BaSO$_4$) which has a reflectivity of substantially 100%.

The laser beam 5, as described above, is deflected transversely relative to the luminescent storage screen 4 and is incident through a narrow, slot-shaped passage or opening 19 between the holder 15 and the half-shell 14. As a result, the laser beam 5 sweeps the luminescent storage screen 4 along a line, so that the pixels of the luminescent storage screen 4 lying on the scan line are successively caused to luminesce. The light emitted by the excited pixels, of a second wavelength, propagates in all directions and is reflected by the mirrored surfaces of the light conductor 13 until it is incident on the light-sensitive surface of the detector 16, and thus contribute to the overall electrical output signal.

Figure 4:
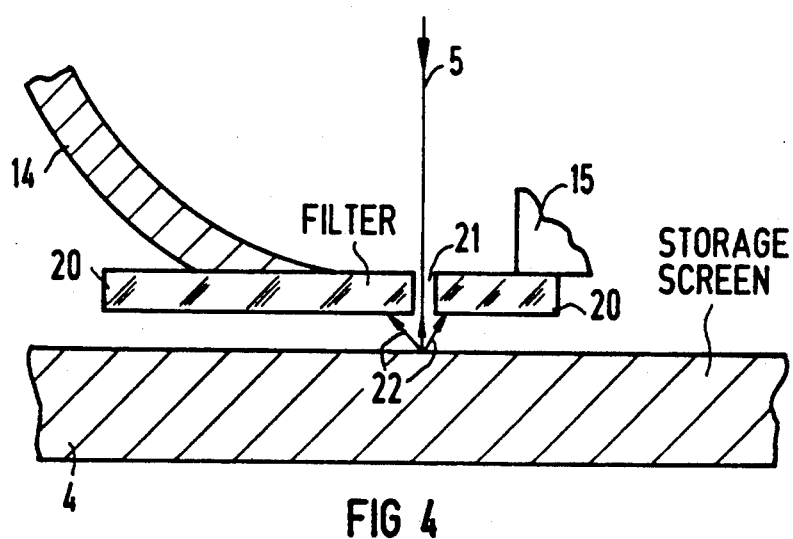
FIG. 4 is an enlarged side sectional view showing details of the filter in the read-out system of FIG. 3 constructed in accordance with the principles of the present invention.

As can be particularly seen in FIG. 4, a filter 20 is disposed in front of the entry opening of the light conductor 13, in the immediate proximity of the scan line of the scan beam 5 on the luminescent storage screen 4. The filter 20 has a slot-shaped opening 21 for permitting the scan beam 5 to pass therethrough in the region of the point of incidence of the beam 5 on the luminescent storage screen 4, and thus in the region of the scan line. The scan beam 5 can thus penetrate the filter 20 unimpeded, and excite the stimulable phosphor in the luminescent storage screen 4. The rays 22 of the scan beam 5 which are reflected at the surface of the luminescent storage screen 4 are eliminated (blocked) by the filter 20, so that they cannot penetrate into the entry opening of the light conductor 13. A small portion of the reflected rays 22 will lie in a very narrow range of the angle of reflection, and will be able to proceed through the opening 21 into the light conductor 13. If this small portion of the reflected rays is reflected by the mirrored surfaces of the light conductor 13 so as to proceed directly toward the detector 16, they will be prevented from reaching the detector 16 by the filter 18. If some rays of this small portion are reflected by the interior surfaces of the light conductor 13 back toward the luminescent storage screen 4, they will be prevented from reaching the luminescent storage screen 4 by the filter 20, thus avoiding the problem of premature read-out discussed above.

It is thus assured that the reflected rays 22 will neither cause a premature read-out of the scan line nor proceed into the detector 16, so that image disturbances due to reflections of the scan beam 5 are avoided.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a read-out system for a luminescent storage screen, including means for planarly scanning the luminescent storage screen pixel-by-pixel with a deflected scan beam of a first wavelength thereby causing said luminescent storage screen to luminesce and emit light of a second wavelength, and a light conductor which conducts said light of said second wavelength onto a detector means for generating an electrical signal corresponding to the brightness of said light of second wavelength, the improvement comprising:

a filter for blocking said light of said first wavelength disposed in the immediate proximity of the point of incidence of said scan beam on said luminescent storage screen, said filter having a slot-shaped opening therein for permitting unimpeded passage of said scan beam through said filter onto said luminescent storage screen.

2. The improvement of claim 1 wherein said detector means includes at least one light detector element, and further comprising a further filter for blocking said light of said first wavelength disposed directly in front of said light detector element.

3. The improvement of claim 1 wherein said light conductor is a tubular light conductor having a slot-shaped passage therein for permitting said scan beam to pass through said light conductor, said tubular light conductor having an opening in a wall thereof, wherein said detector means is disposed opposite said opening, and said light conductor having an entry opening for light of said second wavelength emitted by said luminescent storage screen, said filter being disposed in front of said entry opening of said light conductor.

* * * * *